Nov. 7, 1950     L. R. HENDERSON     2,529,336
TREE PLANTER
Filed July 7, 1949     2 Sheets-Sheet 1
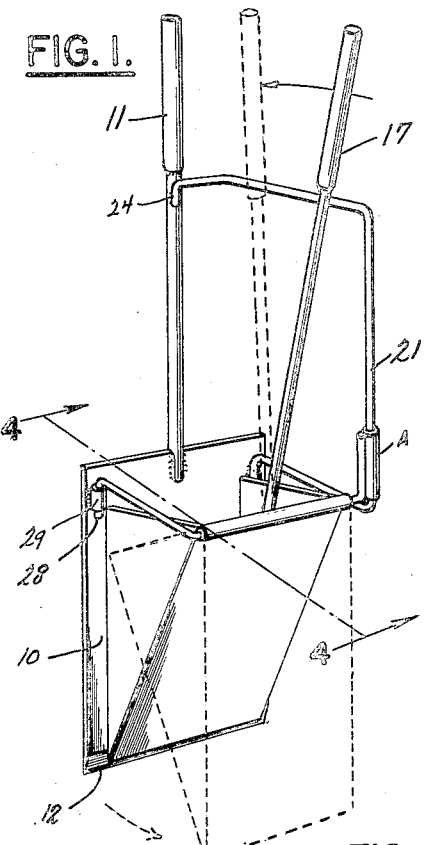
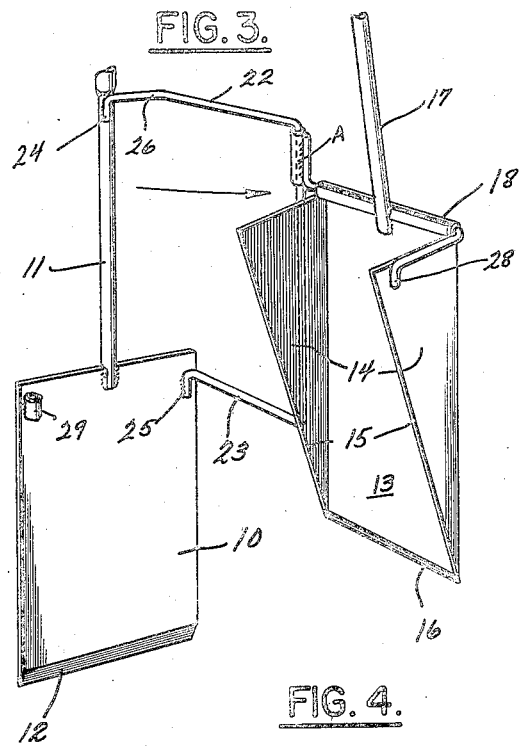
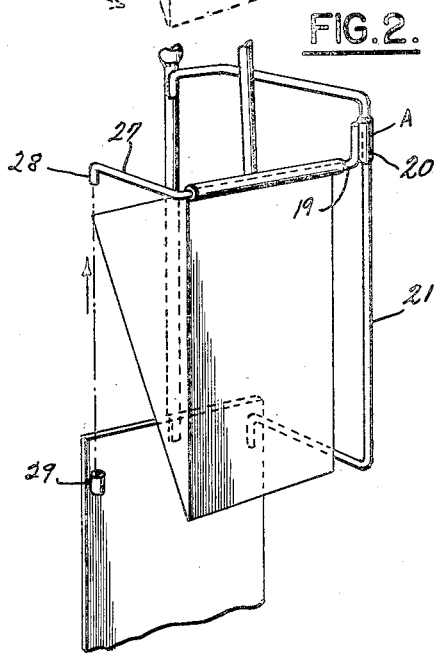
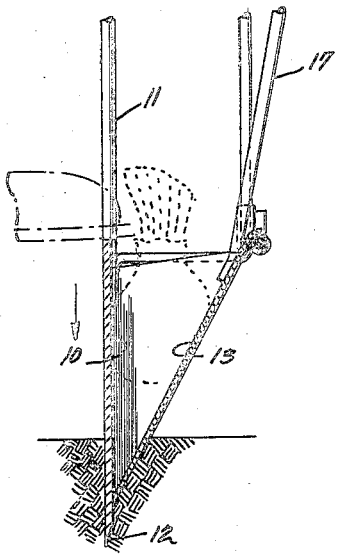
INVENTOR
Lee Roy Henderson
BY Wilkinson & Mawhinney
ATTORNEY Nov. 7, 1950        L. R. HENDERSON        2,529,336
TREE PLANTER
Filed July 7, 1949        2 Sheets-Sheet 2
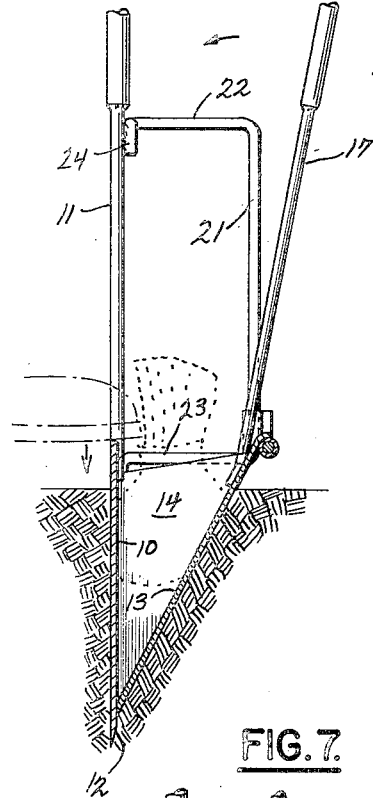
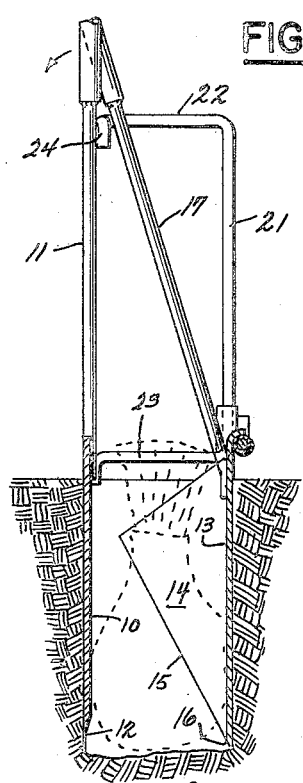
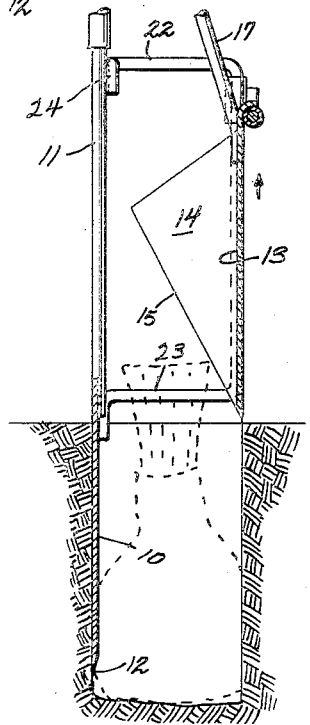
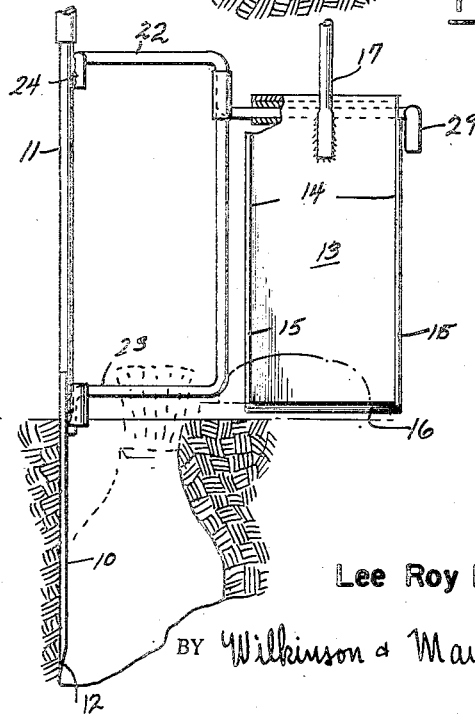
INVENTOR
Lee Roy Henderson
BY *Wilkinson & Mawhinney*
ATTORNEY Patented Nov. 7, 1950

2,529,336

UNITED STATES PATENT OFFICE 2,529,336

TREE PLANTER

Lee Roy Henderson, Kosmos, Wash., assignor of one-half to Alfred C. Seago, Kosmos, Wash.

Application July 7, 1949, Serial No. 103,469

4 Claims. (Cl. 111—4)

The present invention relates to improvements in tree planters and has for an object to provide an improved device for use in the planting of trees in which seedlings two to three years old for example may be planted the proper depth and with proper space for receiving the roots in addition to native earth in and about the roots with provision for expanding the hole in which the seedling is initially inserted whereby additional native or other earth may be filled into the hole and tamped by the feet of the operator or otherwise to effect a final planting with assurance of the life of the planted tree.

Particularly in the western states extensive tree planting is taking place under Government sponsorship in which the Government is engaged in a program of encouraging the planting of trees by agreeing to pay for the trees and the planting. However when planted by hand only about ten per cent of the trees live. It is therefore an object of the present invention to provide an improved planter in which more than ninety per cent of the trees will live and thrive and a further object of the invention is to the end of saving Government money by the assurance that the trees planted under this sponsorship will not become waste but will thrive and in short the invention has for its still further object to promote the Government program in this respect.

With the foregoing and other objects in view, the invention will be more fully described hereinafter, and will be more particularly pointed out in the claims appended hereto.

In the drawings, wherein the symbols refer to like or corresponding parts throughout the several views, Figure 1 is a perspective view of an improved tree planter constructed in accordance with the present invention and shown in the closed position ready to receive a seedling and with the pocket shown in dotted lines as having been opened.

Figure 2 is a similar view with the handles broken away and the pocket shown in the raised position.

Figure 3 is also a perspective view showing a subsequent position of the raised pocket in which the latter has been rotated through an angle of approximately 90 degrees.

Figure 4 is a vertical section taken on the line 4—4 in Figure 1 with the handles and a portion of the framework broken away, and with a seedling indicated at dotted lines as placed in the device and with the foot of the operator indicated in dotted lines as exerting force upon the spade blade.

Figure 5 is also a vertical sectional view of the improved tree planter with the handles broken away and showing a subsequent position to that in Figure 4 wherein the device has penetrated to the desired depth.

Figure 6 is a vertical section similar to Figures 4 and 5 by showing the pocket in the open position and the seedling indicated in dotted lines as deposited in the hole thus formed.

Figure 7 is also a vertical sectional view with parts broken away and parts shown in section and illustrating the pocket raised from the hole and, Figure 8 is also a vertical section of the device with the pocket swung aside from the hole to admit the filling and tamping of earth about the roots of the planted seedling.

Referring more particularly to the drawings, 10 designates a spade blade and 11 the handle thereof, both of which parts may be made from suitable metal welded or otherwise secured together. The lower edge of the spade blade 10 is preferably sharpened or beveled as indicated at 12 to facilitate penetration into the earth.

An end wall 13 and side walls 14 constitute a pocket with inclined edges 15 of the side walls 14 adapted to engage against the spade blade 10 to form a closed pocket construction to receive the tree or seedling. The inclined edges 15 require the end wall 13 to assume an angular position converging downwardly toward the plane of the spade blade 10 and at the lower edge 16 of the pocket end wall 13 the same is beveled to fit tightly against the lower portion of the spade blade 10 as indicated in Figures 1, 4 and 5.

The pocket is provided with a handle 17 which may also be welded or otherwise affixed to the upper portion of the pocket end wall 13.

The upper edge of the pocket end wall 13 is rolled to form a casing or tube rotatable on a horizontal bar 19 which is supported by a sleeve 20 slidable and rotatable on a vertical bar 21 supported by the outrigger arms 22 and 23. These arms 22 and 23 are welded or otherwise affixed to the handle 11, as indicated at 24, and the spade blade 10, as indicated at 25. In the arm 22 is included an elbow 26 in order to bring the arm 22 to a correct position over the lower arm 23 to support the vertical bar 21 at the side of the device in position to receive the sleeve 17 which lies at one side of the pocket member.

The other end of the horizontal bar 19 carries a free arm 27 having a downwardly projecting detent or finger 28 adapted to vertically slide in and out of a tubular keeper 29 welded or otherwise affixed to the upper portion of the spade blade 10 at the opposite side from the point 25 at which the arm 23 is affixed.

In use the parts are caused to assume the full line position indicated in Figure 1 in which the pocket member is in the lower position and closed against the spade blade 10 with the detent 28 occupying the keeper 29.

In this position the seedling, as indicated in Figure 4, is loaded downwardly through the upper open end of the device into the pocket. The lower edge 12 of the spade blade 10 is then pushed downwardly into the earth as by the weight of the foot indicated in Figures 4 and 5.

When the device has been pushed down to the desired depth, the handle 17 is swung in the direction of the upper arrow in Figures 5 and 6 or in other words toward the spade handle 11. In other words this handle 17 is forced over to the left causing the pocket member to rotate about the horizontal bar 19 and in so doing to push the earth away from the spade or to the right and to compact the same to one side thus developing a hole as indicated in Figure 6 and at the same time withdrawing the sloping pocket end wall 13 from the path of the seedling and permitting the seedling to drop into the bottom of the hole.

Referring more particularly to Figure 7 the next operation involves the raising of the pocket member by means of its handle 17, the sleeve 20 sliding upwardly on the vertical bar 21 until the same reaches the upper arm 22 which forms a stop for the sleeve. In this position the lower edge 16 of the pocket end wall 13 will clear the surface line of the ground to permit the subsequent operation, shown in Figure 8, of swinging the pocket member on the sleeve 20 and about the vertical bar 21 through an angle of approximately 90 degrees which will remove the pocket member from the upper portion of the hole thus leaving the latter exposed for the filling in of additional earth and the tamping of the earth by the feet of the operator. The right foot of the operator may be used to firm down the earth about the newly planted tree.

After this operation the entire device including the spade blade 10 is lifted from the hole and the left foot of the operator is also used to tamp or firm down the newly added earth at the opposite side of the tree lately occupied by the spade blade 10. In other words the right foot may hold the earth down at the pocket side while the left foot now tamps the earth down at the spade side of the tree. The device will be made of heavy gauge metal and the frame formed by the arms 22, 23 and the vertical bar 21 are made of round bar steel of suitable thickness to insure rigidity.

The device of course may be made in any size and of any materials desired.

When the pocket member is raised the detent 28 will lift clear of the keeper 29 but this detent and keeper will hold the pocket and spade members in rigid closed relationship during the initial act of planting the tree.

Although I have disclosed herein the best form of the invention known to me at this time, I reserve the right to all such modifications and changes as may come within the scope of the following claims.

What I claim is:

1. An improved tree planter comprising a spade member, a frame including a vertical bar carried by said spade member, a sleeve slidably and rotatably mounted on said vertical bar, a horizontal bar carried by said sleeve, and a pocket member pivoted about said horizontal bar and swingable thereabout toward and from said spade member.

2. An improved tree planter as claimed in claim 1 characterized by the fact that a free arm is carried by said horizontal bar at the end opposite said sleeve, said free arm having a detent, and a keeper on the spade positioned to be occupied by said detent in the lower position of the pocket member.

3. An improved tree planter as claimed in claim 1 characterized by the fact that a handle is attached to the pocket member for rotating the pocket member about said horizontal bar and for lifting the pocket member by the sliding of the sleeve on said vertical bar and for the rotation of said pocket member and sleeve about said vertical bar.

4. An improved tree planter as claimed in claim 1 characterized by the fact that said pocket member comprises an end wall and side walls with inclined edges converging downwardly toward the plane of the end wall and adapted to fit against said spade member with said end wall assuming an inclined position converging downwardly to the plane of said spade member.

LEE ROY HENDERSON.

REFERENCES CITED

The following references are of record in the file of this patent:

UNITED STATES PATENTS

| Number | Name | Date |
|---|---|---|
| 362,465 | Silsby | May 3, 1887 |
| 671,953 | Dillon | Apr. 16, 1901 |
| 1,129,924 | Von Hassel | Mar. 2, 1915 |
| 1,496,647 | Kennedy | June 3, 1924 |
| 1,771,694 | Talvitie | July 29, 1930 |
| 1,870,043 | Erickson | Aug. 2, 1932 |